April 17, 1956     S. BILOTTA     2,742,159

LIQUID FILTER UNIT

Filed June 8, 1953

INVENTOR.
SALVATORE BILOTTA
BY
*William J. Ruano*
ATTORNEY

United States Patent Office 2,742,159
Patented Apr. 17, 1956

2,742,159

LIQUID FILTER UNIT

Salvatore Bilotta, Washington, Pa.

Application June 8, 1953, Serial No. 360,097

2 Claims. (Cl. 210—164)

This invention relates to a multiple filter unit which is useful in filtering sediment from water systems of buildings and the like, although it is useful for other applications such as for filtering oil and other liquids.

An outstanding disadvantage of conventional filter assemblies has been their complicated construction and their high cost of manufacture as well as the difficulties and time required for removing and cleaning the filter units.

Another disadvantage of conventional multiple filter units is that the filter units are generally arranged in alignment, therefore greatly increasing the length of the unit or assembly and making it impractical to couple it in crowded places where space is a limitation.

An object of my invention is to provide a novel multiple filter unit or assembly which is devoid of the above named disadvantages of conventional filter units and which is relatively simple in construction, inexpensive to manufacture and enables easy and quick removal of the filter units for cleaning or replacement.

Another object of my invention is to provide a novel filter unit assembly wherein the filter units are arranged so as to provide maximum compactness and very short overall length of the unit as well as to enable easy removal of sediment or foreign matter collected as well as easy removal and replacement of the individual filter units, independently of one another.

Figure 1:
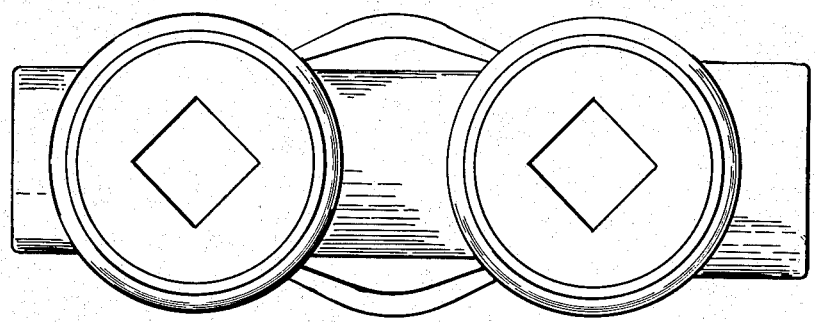
Figure 2:
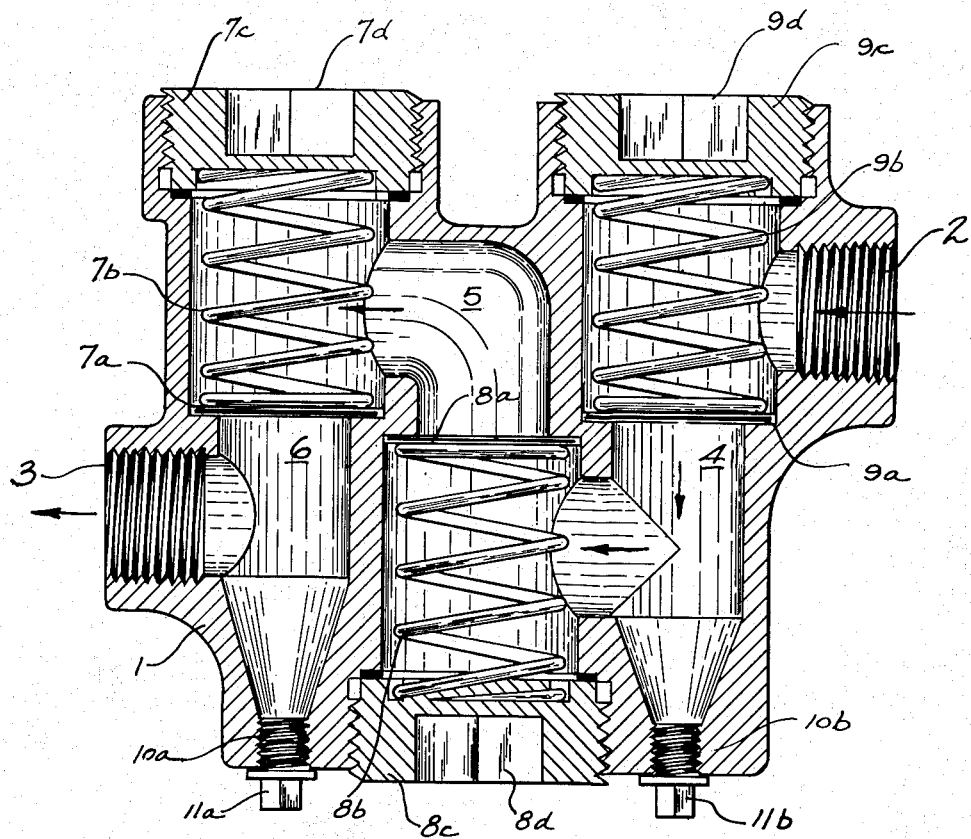

Other objects and advantages of my invention will become apparent from a study of the following description taken with the accompanying drawing wherein:

Figure 1 is a top view of a multiple filter unit assembly embodying the principles of my invention, and Figure 2 is a longitudinal sectional view thereof and more clearly showing the arrangement of the filter units and other interior parts of the unit.

Referring more particularly to the drawing, numeral 1 denotes a body or housing of a filter unit with a threaded inlet 2 and a threaded outlet 3 for providing connections with piping in a water supply system, such as in households, although the unit may be employed in other liquid systems wherein it is desired to filter the liquid, such as oil, gasoline, milk, etc. Of course, externally threaded couplings for inlet 2 and outlet 3 may be substituted for the internally threaded coupling portions if desired.

The liquid, such as water from a service main, upon entering inlet 2 flows through ports 4, 5 and 6 in the direction indicated by the arrows, that is, along a sinuous path, and finally emerges through outlet 3. At the outlet end of the various ports 4, 5 and 6 there are provided seats or shoulders for supporting filters or screens 7a, 8a and 9a, respectively, which filters may be of any well-known construction, such as in the form of disc-shaped screens or pads. The filters 7a, 8a and 9a are yieldingly held against their seats by helical springs 7b, 8b and 9b, respectively, which, in turn, are maintained in place and under compression by the well portions in screw-threaded caps 7c, 8c and 9c, respectively. These caps are provided with kerfs 7d, 8d and 9d, respectively. Thus by a suitable tool having an end shaped in the manner corresponding to the kerfs, the various caps may be either screwed tightly against the respective seals shown to maintain the filters in place, and they may be unscrewed individually and independently of each other to enable removal of the springs and filters whenever it is desired to clean or replace any or all of the filters.

The screens 7a, 8a and 9a may be of the same mesh, or screen 7a may be of larger mesh than screen 8a which, in turn, may be of larger mesh than screen 9a for progressively filtering smaller sizes of foreign matter or sediment.

At the lower portion of the valve there are provided screw-threaded drain plugs comprising threaded parts 10a and 10b, which are normally closed by turning bolt head parts 11a and 11b with a wrench. When it is desired to remove sediment or flush out sediment from ports 4 and 6, the drain plugs are unscrewed and removed. If desired, cap 8c may likewise be unscrewed and removed to clean out the central port, thereby providing access to each of the vertically extending and parallel arranged ports.

It will be noted that by arranging the various ports in vertical parallel relationship to provide a sinuous path through the body 1 and the various filter units, maximum compactness and minimum overall length of the valve are obtained, enabling the body to be coupled in places where space is limited. It will also be noted that the specific arrangement of the various filter units and the shape of the flow path through the body enables the various screw-threaded caps 7c, 8c and 9c to provide easy access to the various filters and enables any one filter to be removed and replaced without disturbing the other filters.

Thus it will be seen that I have provided an efficient, multiple filter assembly or unit for filtering sediment and foreign matter from liquids, such as water, in a water supply system, which valve is relatively compact and of relatively simple and inexpensive construction; furthermore I have provided a filter unit having multiple filters which are so arranged as to provide minimum overall length between the inlet and outlet of the unit and at the same time provide quick and easy access to the various filters for cleaning or replacement thereof, and whereby any one filter may be removed or replaced without disturbing the others; also I have provided a liquid filter unit or assembly in which sediment which is collected may be easily drained or flushed and wherein each of the ports may be thoroughly cleaned to avoid the possibility of clogging.

While I have illustrated and described a certain specific embodiment of my invention, it will be apparent that this is by way of illustration only, and that various changes and modifications may be made within the contemplation of my invention and within the scope of the following claims.

I claim:

1. A filter unit for coupling to a liquid supply system, said unit comprising a housing having an inlet and an outlet disposed horizontally on opposite sides thereof, a sinuous path through the housing of said unit, said path including two vertically extending cylindrical bores, each having a portion of reduced diameter terminating in a shoulder, one of said shoulders facing the top, and the other, the bottom of said housing, and a horizontally extending bore interconnecting said bores adjacent the top thereof, a filter supported on each shoulder, a pair of springs, each yieldingly holding a filter against one of said shoulders, a pair of screw threaded caps, each provided with a well portion for receiving the other end of the corresponding spring, one of said caps being threaded to the top of said housing and the other being threaded to the bottom of said housing, whereby flow of liquid through said path and through said filters will be in a direction with the filter-seating action of said springs.

2. A filter unit for coupling to a liquid supply system, said unit comprising a housing having an inlet and an outlet disposed horizontally on opposite sides thereof, a sinuous path through said housing, said path having three vertically extending cylindrical bores interconnected by horizontally extending bores, each vertically extending bore having a portion of reduced diameter forming a shoulder, a filter supported on each shoulder, and a spring yieldingly holding each filter against its shoulder, the two end leg portions having kerfed screw-threaded caps for receiving the other end of the corresponding springs and being located on one end of the housing, the central bore having a kerfed screw-threaded cap for receiving the spring in the central bore and which is screw threaded to the opposite end of said housing, whereby the central spring urges the central filter in a direction opposite to that of the springs in the side bores, drain plugs provided in each of said side bores in an end of the housing opposite to that in which the corresponding screw threaded caps are located, whereby the flow of liquid through said sinuous path will be in a direction with the action of the three aforementioned springs.

References Cited in the file of this patent

UNITED STATES PATENTS

| 691,835 | Wyman | Jan. 28, 1902 |
| 828,467 | Durbrow | Aug. 14, 1906 |
| 1,063,047 | Lohrmann | May 27, 1913 |

FOREIGN PATENTS

| 6,506 | Great Britain | May 18, 1901 |
| 1,527 | Great Britain | Dec. 16, 1905 |
| 157,669 | Great Britain | Jan. 27, 1921 |
| 263,017 | Great Britain | Dec. 23, 1926 |